May 26, 1936.  H. T. WHEELER  2,041,889
METHOD TO FORM PACKING RINGS BY CRIMPING
A PLAIT OF MATERIAL INTO HELICAL WINDS
Filed June 12, 1931    2 Sheets-Sheet 1

INVENTOR.
Harley T Wheeler

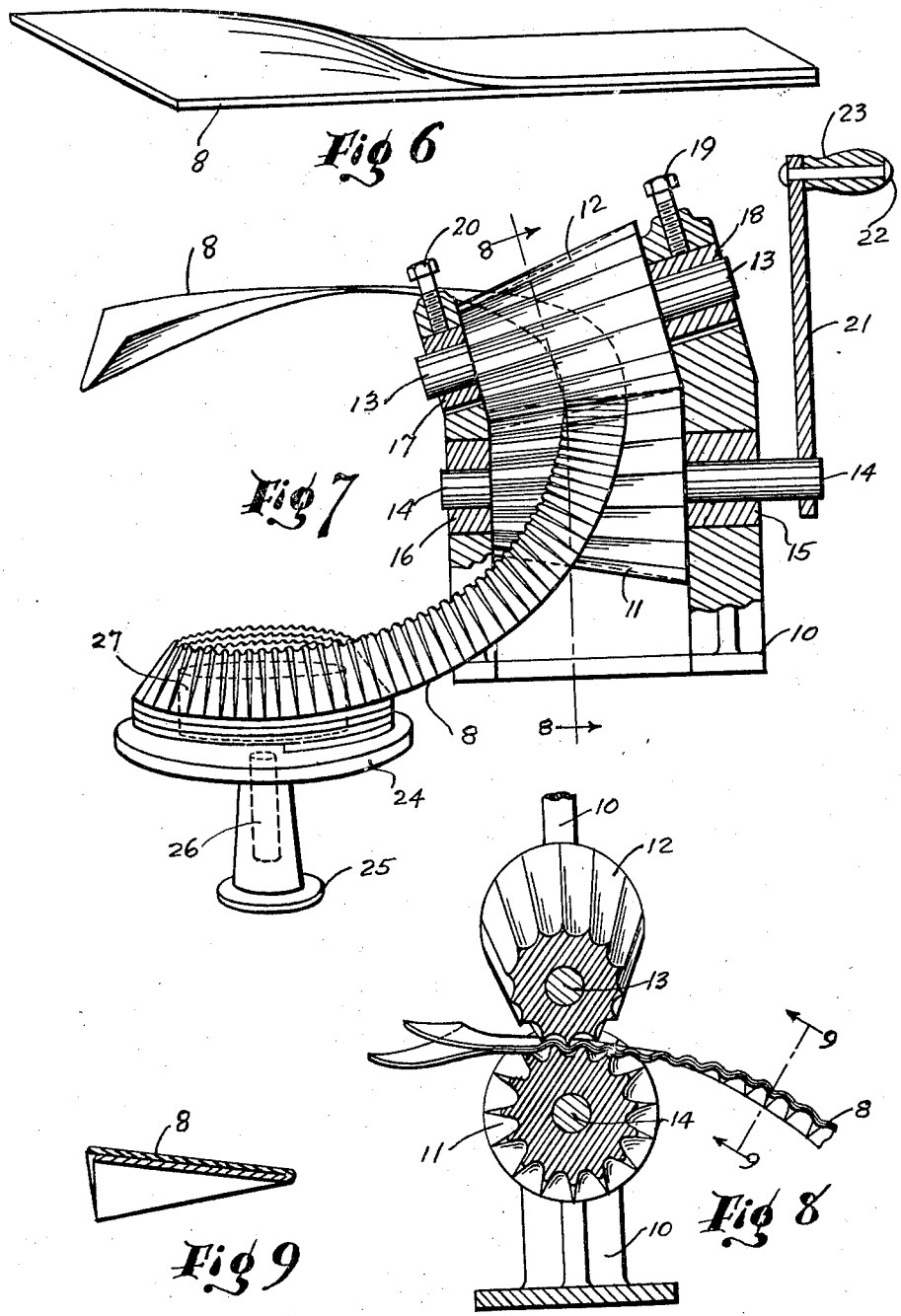

Patented May 26, 1936

2,041,889

UNITED STATES PATENT OFFICE 2,041,889

METHOD TO FORM PACKING RINGS BY CRIMPING A PLAIT OF MATERIAL INTO HELICAL WINDS

Harley T. Wheeler, Dallas, Tex.

Application June 12, 1931, Serial No. 543,791

2 Claims. (Cl. 154—2)

This invention relates to certain improvements in a method of making packing rings and its chief advantage lies in a capability of fabricating from soft materials a ring of great strength.

Another advantage is the great speed and precision of the process.

One other advantage is that rings of any desired weight and thickness may be economically manufactured.

Still another and important advantage is the capability of the finished ring to retain liquids gases or vapours within its confines without the usual disadvantage of saturation.

With the foregoing objects and advantages in view, further advantages due to construction will be disclosed as the description proceeds, accompanied by the drawings, wherein:

Figure 6 is the method of forming the plait of material used in this process.

Figure 7 is a cross-section of the crimping machine used by this process.

Figure 8 is a cross-section of the crimping machine and a plait in process, along line 8—8 of Figure 7.

Figure 9 is a cross-section thru a crimp of the plait along line 9—9 of Figure 8.

Figure 1:
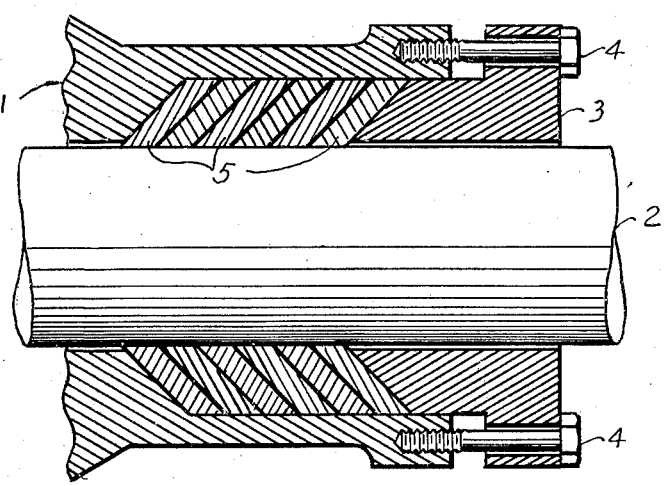
Figure 1 is a cross-section of a stuffing-box using packing rings made by this process.

Referring now especially to Figure 1, a machine body 1 contains a stuffing-box to receive packing rings. A rod 2 extends thru the body 1 and is in the center of the stuffing-box. A packing gland 3 is held in position and tightened by the bolts 4, the packing rings 5 being held against the bottom of the stuffing-box and form contacts with the rod 2 and the wall of the stuffing-box 1. The purpose of the truncated-cone shaped rings 5, used as an example of packing, should be apparent. Due to their lip-shape, any pressure from the machine chamber endeavors to collapse the smaller diameter against the rod to seal off the pressure. The less the pressure, the less the reaction of the packing rings, resulting in a contact friction in some proportion to the impressed pressure.

Figures 2, 3:
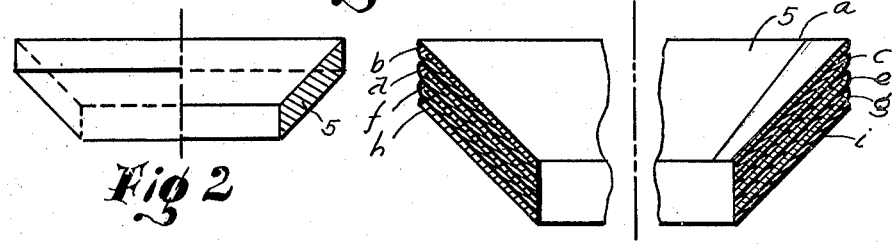
Figure 2 is an external and cross-sectional view of one of the packing rings made by this process.
Figure 3 is a detailed enlargement in cross-section of a packing ring made by this process.

In Figure 2 is shown a half-external view of a packing ring 5, a cylindrical surface being formed for contact against the stuffing-box wall. The other half-section indicates a cylindrical surface for contact with the rod. Thus there are two surfaces of contact concentric with each other, the inner sealing the pressure around the rod and the outer preventing leakage along the stuffing-box wall. It should be understood that the lips of the rings, the small diameter in contact with the rod, are always placed toward the source of pressure, so in the case of a vacuum source of pressure would be reversed from the position shown in Figure 1. For alternate pressure and vacuum, half of the rings would be placed in opposite directions. The truncated-cone type of packing ring is therefore well-adapted to seal pressures of all ranges by its shape, the efficiency of that sealing being a subject of this invention. This invention, however, does not relate to the capability of a truncated-cone ring to seal pressure, but to a method of manufacturing this type of ring so that the friction of contact will be lowered and also distributed over a large area of the packing surface without resorting to such devices as compartment walls, thrust-taking devices, and the like.

I have found by experiment that the internal pressure of an assembly of porous packing rings controls the distribution of friction and that in a single set of porous packing operating on a gaseous or a liquid tension, that most of the friction of contact occurs at the point farthest from the source of pressure because the rate of pressure drop is greatest at that point. As shown in Figure 1, the packing rings 5 are assumed for the moment to be of porous material thru which seepage flows to reduce the impressed pressure to a lower level, the reduction of pressure causing a reaction within the porous structure of the rings which moves them against the rod to seal the pressure, and to be of that type developed in my Letters Patent No. 1,996,779, issued April 9, 1935, a helical wound strip of suitable material, the density of which is controlled by a related process. This invention is an improvement on the foregoing mentioned strip type of ring, in that the flow of seepage is constricted to certain paths, which is not true of invention shown in my Patent No. 1,996,779 above referred to.

Referring now especially to Figure 3, a detailed cross-section of the packing ring 5, made according to this development. The helical winds are made from a plait, herein defined as a pleated strip of suitable material, specifically, that a long narrow strip of material is folded back on itself, as shown in Figure 6. The helical winds of Figure 3 therefore have two edges in contact with the rod and a U-shaped bend in contact with the stuffing-box wall, the operating and structural advantages of which will become apparent as the description proceeds.

Figures 4, 5:
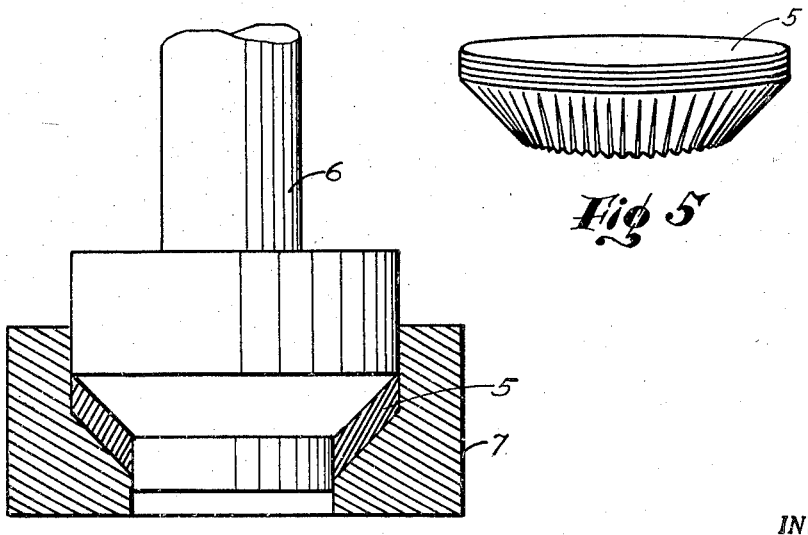
Figure 4 is the means for bringing the rings to size in a die.
Figure 5 is the raw material crimped to ring shape before being finished in the die.

Assuming now the plait shown in Figure 6, the packing ring 5 of Figure 3 starts at point $a$ and is successively wound from $b$ to $c$, $d$ to $e$, $f$ to $g$ and $h$ to $i$, the ends $a$ and $i$ being scarved to prevent a lump in the contour. This therefore is a helically wound plait having the inside exposed edges in a cylindrical surface, and the outer U-shaped bends lying in a cylindrical surface, both surfaces being concentric with each other. Figure 5 shows the helically formed plait in a rough shape ready for finishing to dimensions between the punch 6 and the die 7 of Figure 4, the finished ring 5 of the latter being the source of the rings 5 of Figure 1.

For a description of the process attention is now directed to Figure 7, a crimping machine for shortening one side of the plait of material shown in Figure 6. The base 10 houses all of the working parts, consisting principally of the corrugated rolls 11 and 12 mounted on the shafts 14 and 13 respectively. Each of these rolls is fluted heavily at one end, each of the flutes vanishing at the opposite end, and both fluted rolls are of the same pitch so that they will mesh together when rotated. The shaft 14 is supported by rigid bearings 15 and 16 and is rotated by means of a crank 21 attached to the shaft 14, a handle 23 mounted on a spindle 22, the latter attached to the crank 21 being for convenience in rotating the assembly. The shaft 13 is supported by two adjustable bearings 17 and 18, having a clearance in the housing 10 so that adjusting screws 19 and 20 will vary the mesh between the rolls 11 and 12. A plait of material 8 is inserted between the rolls 11 and 12, the latter rotated, the result being a crimped edge on one side of the plait which causes the latter to lie in helical winds. The plait is wound around a drum 27 situated on a turntable 24 which turns easily on a spindle 26 mounted on a base 25.

Referring now to Figure 8, a cross-section of the crimping rolls on line 8—8 of Figure 7. The space between the rolls 11 and 12 forms a clearance thru which the plait 8 is drawn by rotation of the rolls, the depth of crimping being regulated by the angular relation of the shafts 13 and 14. In Figure 9 is shown a cross-section of the plait 8, along line 9—9 of Figure 8, the overlap of the edges being shown, this overlap being one way at the crest of a crimp and the opposite way in a trough.

Referring now to my application for Letters Patent Serial No. 533,430, dated April 28th, 1931, concerning derived laws of friction in terms of the elements of internal pressure of a porous structure made elastic by pressure, the flow of seepage thru the structure, the density and porosity, and the effects on the friction of contact by saturation of the structure by the pressure, it should be apparent that any design of a porous structure is acted upon simultaneously and will be affected by all of the elements mentioned and that any structure which is made to take advantage of one of these elements must also not be unduly affected to a disadvantage by the others.

Practically, strip type helically wound rings must be adjusted to an "initial-set" in the stuffing-box to close the pores of the outer edges to prevent a high rate of seepage flow and in so doing the friction against the rod is thereby increased, and at the same time the density of the rings adjacent to the rod surface is increased as is the case also with rings formed from plaited strips, and this is a feature which hinders the flow of seepage at the surface most needed for circulation to keep down temperature during operation. And as has also been shown, so long as the temperature and friction values are within the wearing ranges of the materials in contact the strip type of rings are satisfactory. But for higher pressure ranges and for conditions of harsh contacts, lubrication of the contact surfaces becomes an essential, which leads to the justification of this invention.

To lower friction of contact, one method is to increase the amount of lubrication available by a porous structure, so that the circulation of the seepage flow may be increased. One means is to enlarge the pores and interstices of the structure to increase the flow, which at the same time means a higher rate of seepage flow and less capability to react and resist the pressure. On the other hand, if the fineness of the pores and interstices is increased to hold the fluid medium to be used as a lubricant, the undesirable effects of saturation are encountered as indicated by the fourth, seventh, ninth and tenth laws of friction, which indicate that pressure trapped in a porous structure increases the volume of occupancy and causes a loss of friction due to hystersis, with undue wear and loss of power.

In this type of helical wound plait the joint in the fold of the plait furnishes a space for the fluid medium, the open edges of the fold being the entrance and the U-shaped bend a resistance to prevent passage of the medium out of the joint. The joint between the helical plait winds is a series of passages from the rod to the stuffing-box wall and permits a sufficient seepage flow to regulate internal pressure. When a variation of pressure occurs the fluid medium will be forced into the joint between the folds on increase of pressure, and during reduction of pressure the same medium will flow back to the contacting surfaces to supply lubrication during contact. Under constant pressure the fluid medium will pass into the folds to be stored, but not to be affected by the saturation of the adjacent structure walls. Thus by helically winding a plait of flexible material, a reservoir for a fluid medium is provided in every wind and the medium in this continuous reservoir is not affected by saturation or hystersis.

Further ideas as to the application of this method of forming a reservoir in the midst of a plait will be disclosed as the process of manufacture is discussed. Referring again to Figure 6, in preparing the plait, should the material have wire insertion such as is used in commercial asbestos sheet, the asbestos may be folded back on itself and inserted between the crimping rolls of Figure 7 and will retain the crimp. Should a soft material such as cotton or linen be used, it might be necessary to coat the inner surfaces of the plait with a stiffener such as paraffin, the latter being dissipated by heat when put into operation. There are unlimited numbers of similar stiffeners which will dissolve in a liquid or be dissipated when put into operation, but the discussion of such is not the purpose of this specification.

It should be seen that the helical winds need no binder to hold them in position while they are being maneuvered into the dies of Figure 4. Yet when preparing for rough handling or hard service, the winds may be sprayed after crimping and before compression with some mixture as rubber cut with gasoline which will be dissipated when exposed to heat or chemicals which will dissolve the mixture. Should a very elastic ring be required the outer surfaces of the plait may be coated with raw rubber and the assembly cooked in the mould such as is shown in Figure 4, but without cementing the joint in the fold leaving the latter for a reservoir.

To make this type of ring distribute internal pressure of an assembly very uniformly it is only necessary to coat the outer surfaces of the plait with a flexible and impregnable material which will retard the seepage thru the plait walls, and thus reduce saturation, without reducing the storage effect within the fold. Thus the fluid medium will be forced to travel from one fold to the next one succeeding, thus causing a small drop of pressure between each fold which is the necessary method to distribute friction uniformly according to the first and second laws of friction, as shown in my application Serial Number 533,430, before mentioned. Thus this helically wound plait can be made to give the service of a multistage compartment packing, without the mechanical thrust-taking devices, which does not mean, however, that this method can wholly displace the multistage method of packing assembly.

The structural advantage of this plait ring is its great strength. Soaking in liquids cannot displace the winds as will be done with a strip wound type. In extreme vibration conditions the U-shaped bend of the plait has a structural strength not found in strips. And contrary to the strip type, the packing ring may be removed from a stuffing-box after being in service without falling apart. The U-shaped bend of the plait is very strong and resists any tendency to deform it as an assembly of winds, yet each side of the plait is as flexible as a helically wound strip for the purposes of sealing off pressure against a moving surface. It should now be apparent that the crimping process as herein described is the only conceivable way by which a plait of flexible material can be formed into a plait without stretching or unduly compressing its structure. The plait may be crimped at the open edges to make a stuffing-box ring, and for forming rings for traveling pistons the U-shaped bend may be given the crimp, the surface of moving contact in both cases being adjacent to the opening of the fold.

My helically wound plait has an intangible quality not existing in any packing type heretofore made and that is the capability of automatically building up internal pressure to offset mechanical compression. This is accomplished by the fold between laminations which slows down seepage flow thereby building up a high local pressure. This is also explained in detail in my application for Letters Patent, Saturation by synthesis, Serial No. 600,246 filed March 21, 1932.

No claims are herein made for the advantages of the varied packing rings which can be made by this process, that being the subject of succeeding applications for Letters Patent. But as the principle may be broadly applied, such applications being too voluminous for this specification, such constructions as may be included under the following claims are construed to be within the spirit of the invention.

I claim:

1. A method of forming a rod packing of porous material which comprises the steps of folding a strip of the porous material substantially along its center line to provide a plait having one edge open and the other edge closed by the U-bend of the strip, crimping the strip so that the crimp is maximum at the open side of the plait and varies to a minimum adjacent the closed edge of the plait so that the plait takes a helical configuration and the crimping action forms the open edge with one of the sides of the strip slightly shorter than the other, forcing the helical windings of the plait together into a frusto-conical shape with the shorter side of the strip on the concave side so that both sides will contact the rod to be packed and the U-bend will form a reservoir for seepage.

2. The method of forming a porous annular rod packing with a reservoir for seepage which comprises making a longitudinal fold in a strip of the packing material to form a plait with the edges of the strip forming one edge of the plait and the U-bend of the strip forming the other edge of the plait, crimping the plait with tapered corrugations which are deepest along the open edge of the plait so that it is formed into a ring of helical windings with the open edge of the plait on the inside and the U-bend on the outside so that each winding of the packing forms a reservoir open along the rod and closed by the U-bend.

HARLEY T. WHEELER.